(No Model.) 3 Sheets—Sheet 2.
M. W. HART
CHECK ROW CORN PLANTER.
No. 437,338. Patented Sept. 30, 1890.
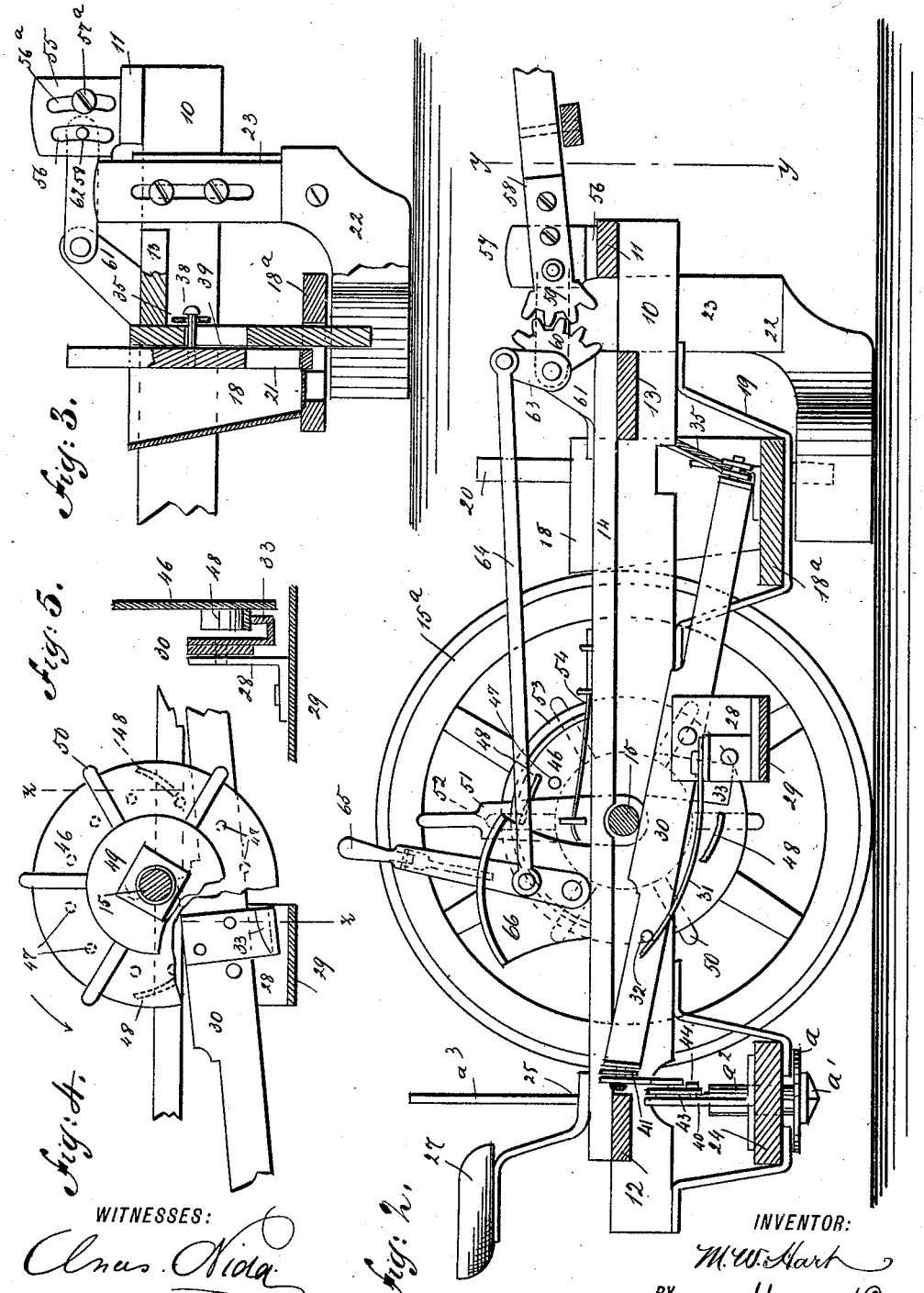
WITNESSES:
INVENTOR:
M. W. Hart
BY Munn & Co.
ATTORNEYS.

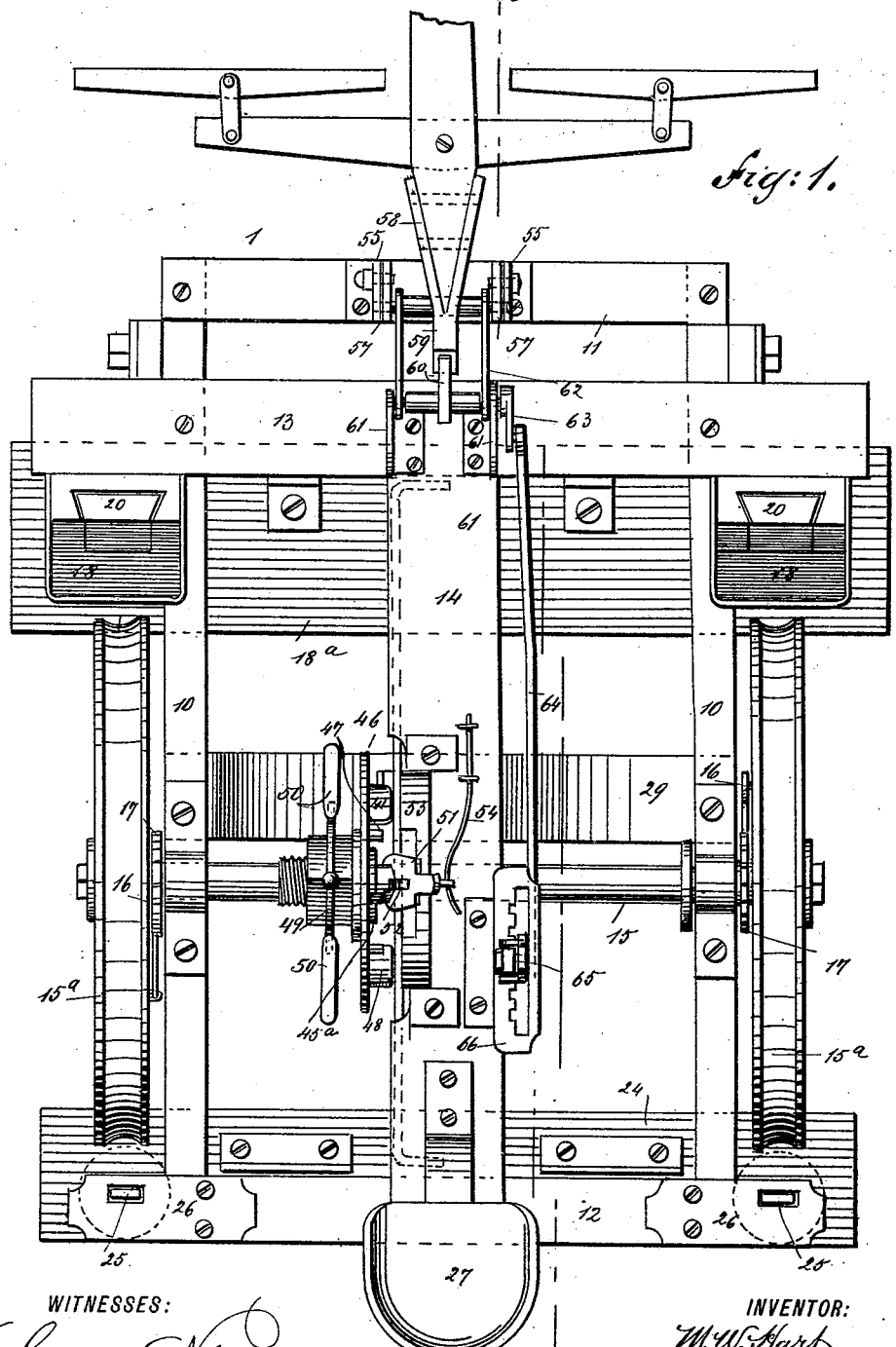

(No Model.) 3 Sheets—Sheet 3.

M. W. HART
CHECK ROW CORN PLANTER.

No. 437,338. Patented Sept. 30, 1890.

WITNESSES:
Chas. Nida
C. Sedgwick

INVENTOR:
M. W. Hart
BY Munn & Co.
ATTORNEYS.

UNITED STATES PATENT OFFICE.

MARSHALL W. HART, OF YELLOW BUD, OHIO, ASSIGNOR TO HIMSELF, L. S. BROWN, GEORGE A. EBENHACK, AND JOHN C. McGAHAM, ALL OF SAME PLACE.

CHECK-ROW CORN-PLANTER.

SPECIFICATION forming part of Letters Patent No. 437,338, dated September 30, 1890.

Application filed October 9, 1889. Serial No. 326,380. (No model.)

*To all whom it may concern:*

Be it known that I, MARSHALL W. HART, of Yellow Bud, in the county of Ross and State of Ohio, have invented a new and useful Improvement in Check-Row Corn-Planters, of which the following is a full, clear, and exact description.

My invention relates to an improved check-row corn-planter, and has for its object to provide a means whereby the implement will plant both ways of a field and check-row without a wire, and to so construct the implement that it will be compact, durable, and economic, and wherein the drop-slides and markers will be operated simultaneously from the same drive-shaft.

The invention consists in the novel construction and combination of the several parts, as will be hereinafter fully set forth, and pointed out in the claims.

Reference is to be had to the accompanying drawings forming a part of this specification, in which similar letters and figures of reference indicate corresponding parts in all the views.

Figure 6:
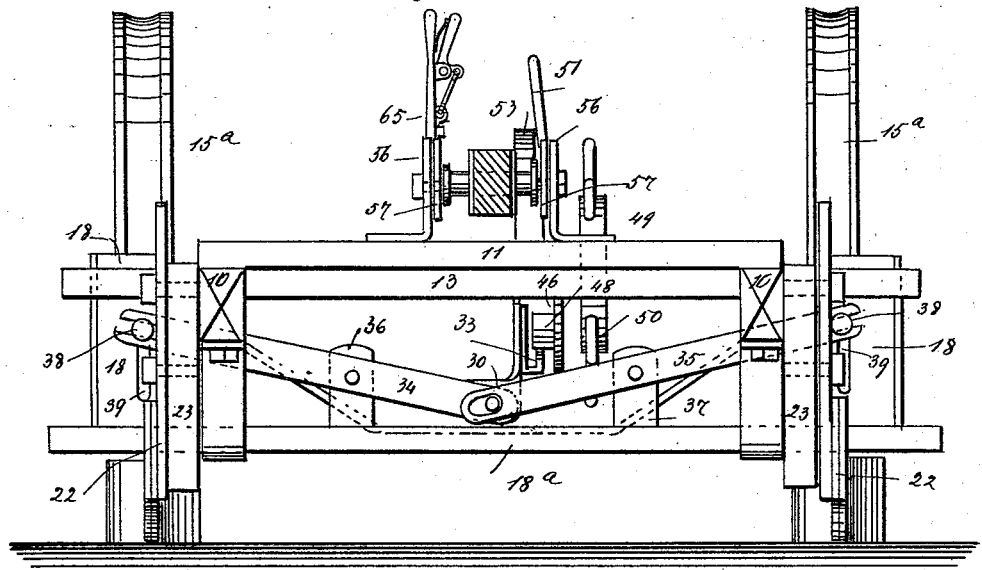
Figure 7:
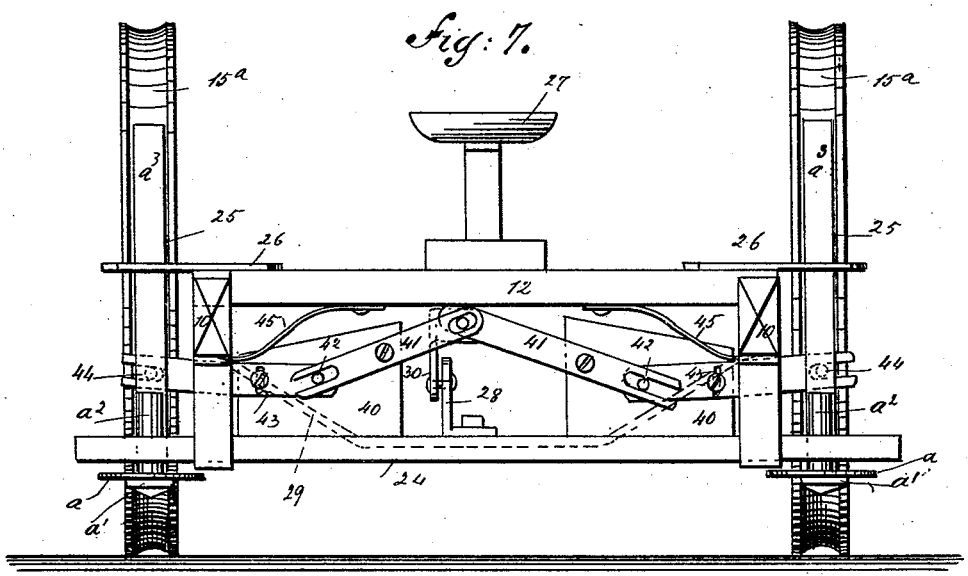

Figure 1 is a plan view of the implement. Fig. 2 is a longitudinal section on line $x\,x$ of Fig. 1. Fig. 3 is a central vertical section through one of the corn-boxes. Fig. 4 is a detail view of the regulating device controlling the movements of the markers and drop-slides, and Fig. 5 is a section on line $z\,z$ of Fig. 4. Fig. 6 is a front elevation of the implement, the tongue being sectioned on the line $y\,y$ of Fig. 2; and Fig. 7 is a rear elevation.

In carrying out the invention the frame consists, principally, of two side pieces 10, connected at the front and rear by cross-bars 11 and 12, and a third cross-bar 13, located near the front, which latter bar extends beyond the side pieces of the frame. The rear cross-bar 12 and intermediate cross-bar 13 are connected by a longitudinal bar or beam 14, located, preferably, at or near the center of the frame, as best shown in Fig. 1.

In the side bars of the frame the axle 15 is journaled, which also serves as a drive-shaft, the drive-wheels $15^a$ being loosely mounted thereon and each provided with a spring-actuated dog 16, contacting with a ratchet-wheel 17, secured to the axle. The drive-wheels are preferably three and a half feet apart and seven feet in circumference, being adapted to operate the drop-slides and markers twice at each revolution. By means of the ratchet placed at each end of the axle the said axle is made to revolve when the implement is drawn forward, remaining stationary when the implement is backed. The arrangement of the ratchet devices also admits of the implement being readily backed and turned.

The corn-boxes 18 are located one in front of each drive-wheel outside of the frame, being supported by resting upon the transverse platform $18^a$, secured to brackets 19, fastened to the side pieces of the frame and contacting with the projecting ends of the intermediate frame cross-bar 13. Each corn-box is provided in its forward side with a vertical dovetail groove in which a drop-slide 20 has vertical movement. The slides are provided at each lower end with a pocket 21, as shown in Fig. 3, and the said lower end of each slide is capable of passing down through an opening in the platform $18^a$ between the bifurcated or flaring ends of the plow or runner 22, which also acts in the capacity of a boot. Thus at each downward movement of the drop-slides the full quantity of grain is delivered to the hill. The plows or runners are adjustably attached to posts 23, projected downward from the front side edge of the frame.

A rear platform 24 is located transversely on the frame, being secured to brackets attached to the under face of the frame side pieces, which platform is of sufficient length to extend beyond the sides of the frame immediately back of the drive-wheels.

A marker 25 is held to slide vertically through each projecting end of the platform 24, preferably consisting of a disk-like head $a$, having an essentially conical center $a'$ and a round body $a^2$, provided with a flattened extension $a^3$, which latter is made to pass through an opening formed in a horizontal plate 26, secured to and projecting beyond the sides of the frame, as best shown in Figs. 1 and 7. By this means the markers are guided in their vertical movement, the head of each marker being located below the under surface of the rear platform 24, as best illustrated in Fig. 2.

The driver's seat 27 is located at the back of the frame midway between the markers, which extend above the frame. Thus the driver is enabled to readily determine if the markers, which are in the center of each hill, are in perfect alignment with previously-planted hills.

Upon a post 28 of a transverse bracket 29, attached to the under central portion of the frame, a trip-lever 30 is fulcrumed, which lever extends longitudinally of the frame over both the front and rear platforms 18ª and 24. The lever is maintained in its normal position, which is inclined downward from the rear in the direction of the front, by a spring 31, secured at one end to the post 28 and bearing at its other end against the under side of a pin 32, located upon one side of the lever between its center and rear end, as best illustrated in Fig. 2. The said lever is further provided immediately to the rear of its fulcrum with an attached shoe 33, extending outward beyond the under edge, as best shown in Fig. 5, the upper contact-surface of the shoe being inclined or curved, as shown in Fig. 4.

The ends of two short levers 34 and 35 are pivotally attached to the forward extremity of the main or trip lever 30, as illustrated in Fig. 6, the said short levers being respectively fulcrumed near their center upon studs or posts 36 and 37, located upon the front platform 18ª, one at each side of its center. The outer end of each lever 34 and 35 is extended upward to a contact with the front face of a corn-box, and the outer extremities of said levers are slotted to receive a pin 38, attached to the drop-slide 20 of each box, the said pins being capable of vertical movement in slots 39, formed in the front faces of the boxes, as shown in Fig. 3.

The rear end of the main lever 30 is connected with the markers 25 to move the same simultaneously with the drop-slides. This connection is effected as follows: Posts 40 are secured to the rear platform—one at each side of the center—as shown in Fig. 7, and near the inner end of each post a lever 41 is fulcrumed, the inner ends of which levers are loosely pivoted to the main lever 30, the outer ends being slotted to receive pins 42 upon the inner ends of another set of levers 43, the latter levers being fulcrumed near the outer ends of the posts. The outer extremities of this second set of levers are also slotted to receive pins 44, secured to the flat extensions a³ of the markers. (See Figs. 2 and 7.) Springs 45 are secured to the rear cross-bar 12 of the frame, having a bearing upon the outer set of levers, and the said levers at their fulcrum are capable of a limited lateral movement, likewise the inner set of levers at their connection with the main or trip lever. Thus, should the markers in their descent strike a stone or very hard ground, undue tension is not exerted upon the levers 42 and 43 or upon the main lever. In fact, all shock to the levers in such an emergency is avoided.

Upon the axle 15, at the left of the center, a washer 45ª is attached, and upon the axle a disk 46 is loosely mounted, provided with a series of spaced pins 47, arranged in a circle upon its right-hand face, and two short segmental cam-ribs 48 are arranged diametrically opposite upon said face, as shown in Fig. 4, the ribs 48 being adapted to contact with the shoe 33 of the main or trip lever at each half-revolution of the drive-wheel and depress the rear end of said lever, thus elevating the forward end.

By reason of the action of the co-operating levers at the forward and rear ends of the implement the drop-slides and markers are simultaneously moved downward, and as soon as the ribs are out of contact with the shoe the spring 31 acts to restore the main lever to its normal position and elevate the slides and markers.

The axle 15 is threaded at the left of the disk 46, and a nut 49 is screwed thereon, provided with a series of radial arms 50, whereby the nut may be readily turned. The disk is held to revolve with the axle by screwing the nut to a contact with the disk and binding it against the washer 45. The disk is not bound so tightly to the axle that it cannot be turned with a suitable lever in the event that the markers are not properly and regularly spacing the hills. This is accomplished through the medium of a lever 51, pivoted upon the side edge of the longitudinal frame-beam 14 immediately over the axle. This lever is capable of movement to and from the disk and also of movement in the direction of the length of the frame. The lever is provided upon its face opposite the disk with a stud or projection 52, so located that when the lever is carried in the direction of the disk the said stud or projection may be entered between two of the opposing pins of the disk.

The lever is guided in its movement in the direction of the length of the frame by a notched bow 53, secured to the frame-beam 14 and provided with a recess for the reception of the lever, and the said lever is normally held within the said recess of the bow by a spring 54, secured to said frame-beam 14 at one end and attached to the lever at its opposite end, as best shown in Fig. 1. Thus, should the markers and droppers not work in perfect time and it is necessary to revolve the disk and cause the ribs to contact at a different interval with the shoe of the main lever, the lever 51 is carried in the direction of the disk until it contacts with any conveniently located pin, whereupon by forcing the lever either toward the front or toward the rear of the implement the disk may be revolved a proper distance.

Upon the forward cross-bar 11 of the frame two spaced vertical standards 55 are secured, provided with longitudinal curved slots 56 and 56ª, which slots constitute slideways for plates 57, one of said plates being in contact with the inner face of each standard. Screws 57ª pass through the slots 56ª to an engagement with the plates 57, whereby the plates 57 can be adjusted relative to the standards 55 and held by tightening the screws 57ª.

In the plates 57 the trunnions of the heel-iron 58 of the tongue or pole are journaled, which trunnions project through the slots 56. The heel-iron is flattened vertically at its inner extremity and toothed to form a segmental gear 59, adapted to mesh with similar gear 60, journaled in standards 61, secured to the frame-beam 14. The trunnions of the heel-iron and the axle of the gear 60 are connected by links 62, and the axle of the gear is also provided with an attached crank-arm 63, the said crank-arm being connected by a pitman 64 with a hand-lever 65, pivoted at the right-hand side of the beam 14, convenient to the driver's seat, the said lever being made to travel in a suitable rack 66. The object of making the plates 57 vertically adjustable and of gearing the pole or tongue is by the manipulation of the lever 65 to elevate or depress the tongue, and thereby raise or lower the plows or runners 22.

The operation is substantially as follows: The disk 46 is secured upon the axle by means of the armed or winged nut 49 tight enough to positively act upon the main lever 30 and attached droppers and markers, but not so tight but that the said disk can be moved forward or backward by means of the lever 51. As the machine moves forward the trips of the disk come in contact with the shoe 33 of the main lever, thereby depressing it, and as the trips pass the shoe the lever is brought back to place by the spring 31. If the ground is uneven, the driver should choose the level side to commence work upon. In going across a field the droppers and markers descend simultaneously, and as the markers are placed in the center of each hill the driver is afforded a perfect guide. At the end of the row the driver raises the plows from the ground by means of the hand-lever 65, and loosens the nut 49 upon the axle, thereby allowing the disk to remain stationary as it is thrown out of gear. In turning around to start another row the driver should commence even with the mark and depress the plows before proceeding. The driver may determine whether or not the implement drops exactly in line with the marks already made by occasionally sighting over the top of the markers and the row in alignment therewith.

If the seeds are dropped too quick, the defect may be remedied by grasping the lever 51 and pressing it against the disk, so as to contact with the pins. The lever is thereupon thrown back quickly and released, so as to pass out of contact with the disk. If the seeds are not dropping quite fast enough, the lever, after contacting with the disk, is pushed forward, which will bring the trip nearer to the shoe upon the main or trip lever.

Having thus described my invention, I claim as new and desire to secure by Letters Patent—

1. The combination, with a main or trip lever, the drop-slides and markers, and connections between said lever and the slides and markers, of a disk capable of being held to the main shaft and provided with depressing-plates engaging said lever, substantially as shown and described.

2. The combination, with a main or trip lever, the drop-slides and markers and auxiliary levers connecting the ends of the main lever respectively with the drop-slides and markers, of a rotating disk provided with attached depressing-plates capable of acting alternately upon the main lever, substantially as shown and described.

3. The combination, with a main or trip lever, the drop-slides and markers, and auxiliary levers connecting the ends of the main lever respectively with the drop-slides and markers, of a shoe attached to the main lever at one side of its fulcrum, a rotating disk, and depressing-plates secured to one face of the disk, adapted for contact with the lever-shoe, substantially as and for the purpose specified.

4. The combination, with the markers and drop-slides of a corn-planter, of a main or trip lever fulcrumed at or near its center, and auxiliary levers connecting one end of the main lever with the drop-slides and the other end with the markers, substantially as shown and described.

5. The combination, with vertically-movable markers and drop-slides capable of similar movement, of a spring-actuated main or trip lever, auxiliary levers connecting one end of the main lever with the drop-slides and the other end with the markers, and a depressing mechanism acting upon the lever and operating from the axle of the implement, substantially as shown and described.

6. The combination, with a trip or main lever and markers connected therewith, of a drive-shaft, a disk mounted upon said shaft, having a series of pins upon one face and depressing-plates capable of contact with the main lever, and a shifting-lever adapted for contact with the disk between its pins, substantially as shown and described.

7. The combination, with a main or trip lever and markers and drop-slides connected therewith, of a drive-shaft, a disk mounted to turn with the shaft, provided with a series of pins upon one face and oppositely-arranged depressing-plates, a shifting hand-lever swiveled in front of the pin-face of the disk and adapted for contact with said pins, and a spring attached to the said shifting-lever and controlling its movements, as and for the purpose specified.

8. The combination, with a main or trip lever and markers and drop-slides connected therewith, of a drive-shaft provided with a collar and a threaded surface near the same, a disk mounted upon the shaft, contacting with the collar and provided with a series of pins and depressing-plates upon one face, a nut provided with arms screwed upon the shaft to an engagement with the disk, and a swiveled shifting-lever capable of contact with the disk between the pins, substantially as and for the purpose specified.

9. The combination, with an axle having an attached washer and a threaded surface near said washer, of a compressing device consisting of a disk mounted upon the axle, contacting with said washer, and provided upon one face with a series of pins and contact-plates, a nut provided with arms or wings, screwed upon the shaft to a contact with the disk, and a spring-actuated swiveled shifting-lever capable of contact with the disk between its pins, substantially as and for the purpose specified.

10. The combination, with a trip-lever and vertically-movable markers, of a series of levers connecting the trip-lever and markers, the connecting-levers having lateral movement at their contacting-points and several of said levers being provided with a compressing-spring, substantially as shown and described, whereby a shock sustained by the markers is not communicated to the trip-lever, as and for the purpose specified.

11. In a corn-planter or similar implement, the combination, with a frame, standards projected upward from the frame at its front end, plates held to slide vertically upon said standards, and a pole having a segmental gear formed at its inner end, which pole is provided with trunnions journaled in the sliding plates, of a second segmental gear meshing with the pole-gear and provided with a crank-arm attached to its axle, a hand-lever, and a pitman-connection between said lever and crank-arm, substantially as shown and described.

12. In a corn-planter or similar implement, the combination with a frame, slotted standards projecting upward from the frame, plates held to slide vertically upon said standards, and screws passing through the standard-slots and engaging the sliding plates, of a pole provided with trunnions journaled in the sliding plates and having a segmental gear formed on its inner end, and a second segmental gear meshing with the pole-gear and provided with a crank-arm, a hand-lever, and a pitman connecting said crank and lever, substantially as shown and described

MARSHALL W. HART.

Witnesses:
WILLIAM W. WHITTEN,
HARRISON SHASTEEN.